United States Patent
Brochier et al.

(10) Patent No.: US 7,137,416 B2
(45) Date of Patent: Nov. 21, 2006

(54) METHOD FOR PRODUCING AN OPTICAL-FIBRE BASED FABRIC

(75) Inventors: Cédric Brochier, Lyons (FR); Jean Piton, Lyons (FR)

(73) Assignee: Cédric Brochier Soieries, Lyons (FR)

( * ) Notice: Subject to any disclaimer, the term of this patent is extended or adjusted under 35 U.S.C. 154(b) by 0 days.

(21) Appl. No.: 11/368,779

(22) Filed: Mar. 6, 2006

(65) Prior Publication Data

US 2006/0144460 A1    Jul. 6, 2006

Related U.S. Application Data

(63) Continuation of application No. PCT/FR04/02253, filed on Sep. 3, 2004.

(30) Foreign Application Priority Data

Sep. 11, 2003   (FR) ................... 03 10700
Jun. 22, 2004   (FR) ................... 04 06784

(51) Int. Cl.
  *D03D 15/00*   (2006.01)
  *D03C 3/00*    (2006.01)
  *G02B 6/00*    (2006.01)
(52) U.S. Cl. ............... 139/420 R; 139/420 A; 139/426 R; 139/59; 362/582
(58) Field of Classification Search .......... 139/420 R, 139/426 R; 362/32, 806, 31; 40/547; 350/96.1
See application file for complete search history.

(56) References Cited

U.S. PATENT DOCUMENTS

| | | | | |
|---|---|---|---|---|
| 3,508,589 A | * | 4/1970 | Derick et al. ......... 139/420 R |
| 4,234,907 A | * | 11/1980 | Daniel ................. 362/556 |
| 4,519,017 A | * | 5/1985 | Daniel ................. 362/565 |
| 4,727,603 A | * | 3/1988 | Howard ................ 2/115 |
| 4,875,144 A | * | 10/1989 | Wainwright ......... 362/103 |
| 5,021,928 A | | 6/1991 | Daniel |
| 5,183,323 A | | 2/1993 | Daniel |
| 5,371,657 A | * | 12/1994 | Wiscombe .......... 362/103 |
| 5,524,679 A | * | 6/1996 | Wiener ............... 139/420 R |
| 5,643,660 A | * | 7/1997 | Price et al. .......... 442/19 |
| 5,702,993 A | * | 12/1997 | Kubomura et al. .. 442/204 |
| 6,030,089 A | * | 2/2000 | Parker et al. ........ 362/103 |
| 6,110,847 A | * | 8/2000 | Yamamoto et al. .. 442/179 |
| 6,651,365 B1 | * | 11/2003 | Wainwright ......... 40/452 |
| 6,779,906 B1 | * | 8/2004 | Delmar ............... 362/122 |
| 6,796,700 B1 | * | 9/2004 | Kraft ................... 362/560 |
| 6,848,803 B1 | * | 2/2005 | Spongberg ......... 362/103 |

(Continued)

FOREIGN PATENT DOCUMENTS

DE    102 06 613 A1    8/2003

(Continued)

*Primary Examiner*—Gary L. Welch
*Assistant Examiner*—Robert Muromoto
(74) *Attorney, Agent, or Firm*—Burr & Brown

(57) ABSTRACT

The invention relates to a method for weaving a fabric containing, at least partly, glass-fibres as warp threads and/or weft threads, which are treated in such a way that they enable light to be diffused in a substantially perpendicular direction with respect to the longitudinal axis of the threads. The method includes a weaving of a Jacquard pattern forming a matrix for separating and identifying the feeding ends of a predetermined number of glass fibres, which are to be rearranged in bundles and connected to the same light source. The fabric produced according said method is also disclosed.

9 Claims, 4 Drawing Sheets

U.S. PATENT DOCUMENTS

| | | | |
|---|---|---|---|
| 6,905,237 B1 * | 6/2005 | Jacobs et al. | 362/556 |
| 7,011,425 B1 * | 3/2006 | Morris et al. | 362/161 |
| 7,021,806 B1 * | 4/2006 | Ovenshire | 362/527 |
| 7,036,970 B1 * | 5/2006 | Shen | 362/561 |

FOREIGN PATENT DOCUMENTS

| | | |
|---|---|---|
| GB | 2 305 848 A1 | 4/1997 |
| WO | WO 02/12785 A1 | 2/2002 |

* cited by examiner

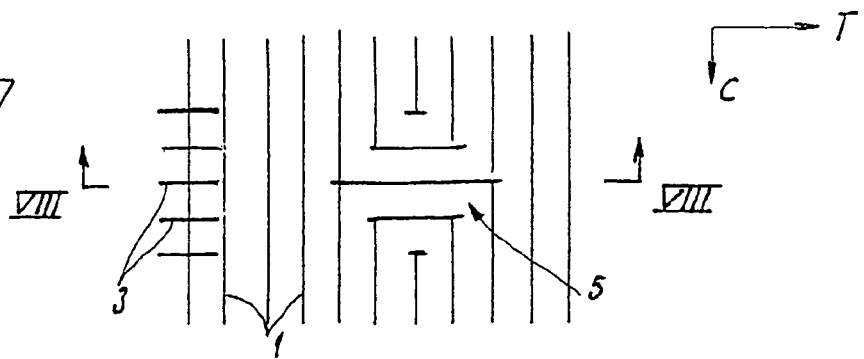
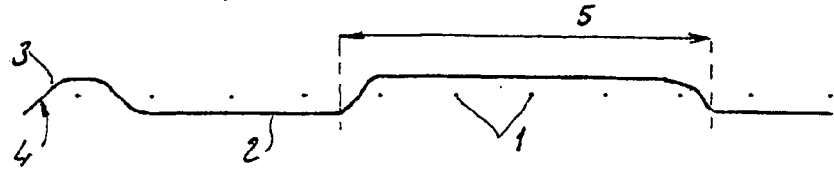
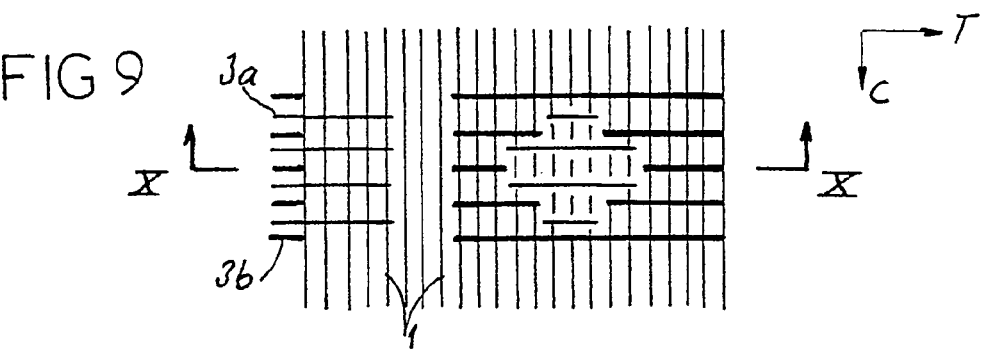
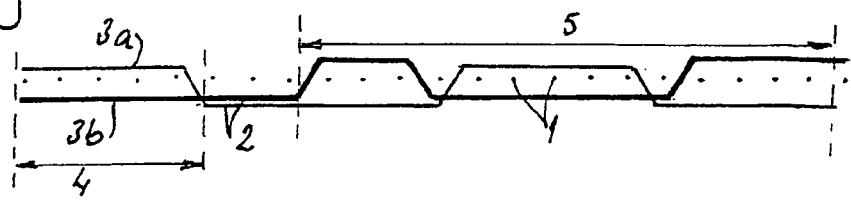
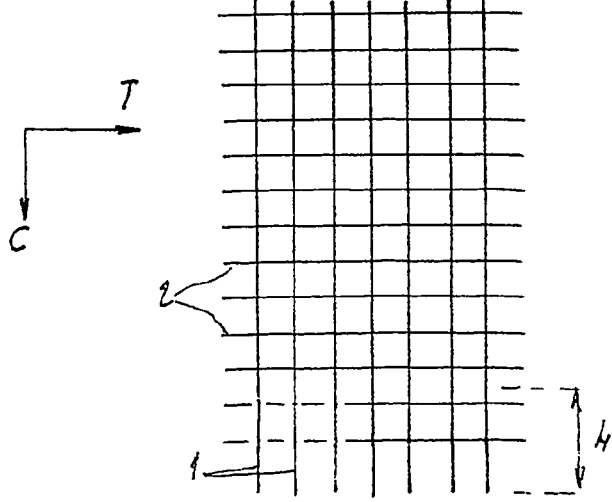
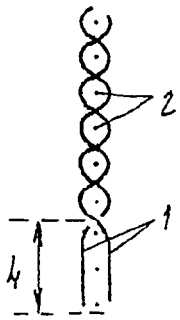

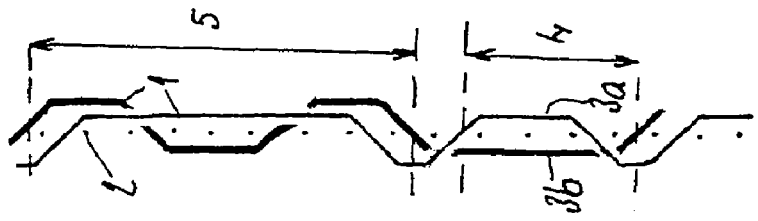
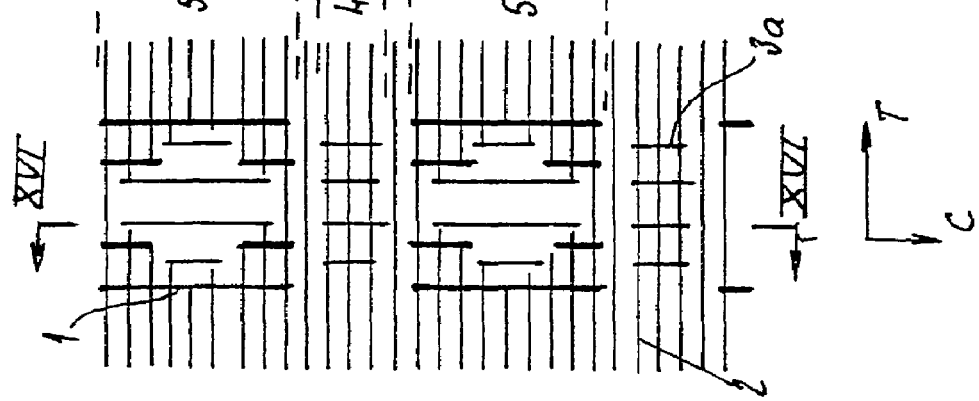
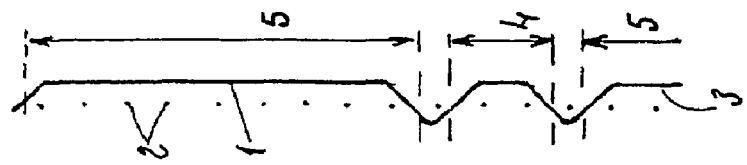
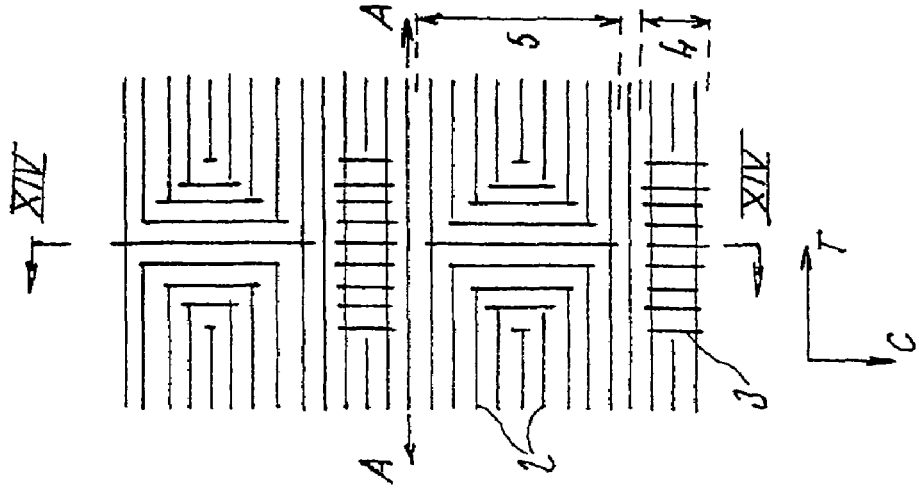

METHOD FOR PRODUCING AN OPTICAL-FIBRE BASED FABRIC

FIELD OF THE INVENTION

The present invention relates to a method for producing fabric comprising optical fibres, more particularly a Jacquard-type weaving method.

BACKGROUND OF THE INVENTION

Textiles comprising optical fibres are known and have been developed in the past, for example using knitting techniques. Such textiles have been described particularly in patent applications U.S. Pat. No. 5,021,928, U.S. Pat. No. 5,183,323, GB 2,305,848 and WO 02/12785.

These known textiles contain optical fibres which may be illuminated by one of their ends, which acts as an input section, in order to render the corresponding piece of fabric luminous. In these luminous textiles the optical fibres constitute the weft and/or warp and may be combined with standard fibres, for example cotton, linen, silk or synthetic textile fibres.

The optical-fibre based luminous fabrics hitherto developed have never been produced industrially since it is only possible to connect a given number of fibres, for example five hundred, to a light source, for example a LED.

It is therefore necessary to count the optical fibres at intervals on the edges of the fabric before bringing them together and connecting their ends, known as "input ends", to a light source.

This applies particularly if the light sources connected to groups—or bundles—of different optical fibres are of a different type, for example of a different power or color.

Until now, no method for weaving optical fibres has offered an industrial solution for separating and identifying independent bundles of optical fibres in fabric and/or of separating and identifying bundles of optical fibres relative to textile threads constituting the base of the fabric.

Up until this point in time, it has been necessary to separate and regroup the input ends of the various fibres of a bundle manually, which is a long, tedious operation that is clearly incompatible with the production of quantities on an industrial scale.

SUMMARY OF THE INVENTION

The purpose of the present invention is therefore to offer a solution to the limits of the optical-fibre based textiles already known by providing a method for weaving optical fibres that separates and identifies the input ends of the various fibres constituting a bundle independent of the other bundles of the fabric virtually automatically in order to facilitate their connection to the light sources of each independent bundle.

The above objectives are achieved using a method for weaving fabric at least partly containing optical fibres as warp and/or weft threads which are treated in such a way that they enable light to be diffused more or less perpendicularly to the longitudinal axis thereof and at least in the sections thereof located on the outer side of the fabric, characterised in that it comprises the weaving of a Jacquard motif forming a matrix that separates and identifies, relative to the adjacent threads, the input ends of a predetermined number of optical fibres intended to be grouped in bundles and connected to the same light source.

To produce an identification matrix, it will be understood that it is necessary to create a more or less complex pattern which particularly uses floats of yarn. Only the Jacquard technique enables such a complex pattern to be obtained for the matrix and simple weaving would be unsuitable.

"Bundle" is understood to refer to a group of optical fibres woven side-by-side to create a common Jacquard motif that appears on the surface of the fabric.

"Float" is understood to refer to the section of a textile or optical fibre woven as weft which is left free and which does not cross the warp threads or, on the contrary, the section of a warp fibre which does not cross the weft threads. Within the scope of the invention the optical-fibre input sections are left floating (the floats may be tied up for the sake of convenience) in order to cut and connect them to light sources after the weaving operation.

For greater clarity, the fabric is defined in the direction of the warp. The direction in which the fabric leaves the loom is taken as a reference. Therefore fabric that has already been produced is referred to as "downstream" and fabric in the process of production is referred to as "upstream".

Weaving a Jacquard motif with the input ends of the various bundles of optical fibres enables the ends of the various bundles to be separated and identified in space relative to one another. It is therefore possible to connect each bundle to a specific light source industrially and possibly using automated means.

According to one advantageous version of the invention, when weaving uses optical fibres as weft threads, the Jacquard weaving of the input ends of the various independent bundles of optical fibres woven as weft causes the input ends of each bundle of these fibres to emerge on one predetermined side of the fabric distinct from that where the adjacent threads emerge, and/or at a predetermined, distinct distance from the first warp thread located between a pattern and the matching matrix and adjacent to said matrix.

Similarly, according to another advantageous version of the invention, when the weaving uses optical fibres as the warp, the Jacquard weaving of the input ends of each bundle of optical fibres woven as warp causes the input ends of these fibres to emerge on one predetermined side of the fabric distinct from that where the adjacent threads emerge, and/or at a predetermined, distinct distance from the first weft thread located downstream of the matrix and adjacent to said matrix.

The method of the invention advantageously also includes the following post-weaving stages in the following order:

(i) bringing together the input ends of the optical fibres of each individual bundle present in the fabric, then (ii) crimping the input ends of each bundle, then (iii) using a hot knife to cut off the input ends of each bundle, then (iv) connecting each bundle of optical fibres to a light source.

The invention also relates to a fabric comprising optical fibres used as warp and/or weft, possibly mixed with natural or synthetic textile fibres, said optical fibres being treated in such a way that they enable light to be diffused more or less perpendicularly to their longitudinal axis and at least in the sections located on the outer side of the fabric, characterised in that its warp or weft comprises at least one bundle of optical fibres intended to be connected to a common light source by their input ends, and in that it also comprises means for identifying and separating the input ends of the optical fibres of said bundle.

The means for identifying and separating the input ends of the optical fibres woven as warp forming each bundle, relative to the adjacent threads, may consist of a Jacquard motif in the pattern of the fabric, forming a separation matrix for the fibres belonging to each bundle, said pattern being woven from input sections of the bundle, such that the input sections emerge on one predetermined side of the fabric distinct from that where the adjacent warp threads emerge, and/or at a predetermined distance distinct from the first weft thread located upstream of the matrix and adjacent to said matrix.

The means for identifying and separating the input ends of the optical fibres woven as warp forming each bundle, relative to the adjacent threads, may also consist of a Jacquard motif in the pattern of the fabric, forming a separation matrix for the fibres belonging to each bundle, the input sections being woven into the identification matrix, each with an adjacent textile warp thread of a predetermined color, each warp thread color belonging to a particular bundle of optical fibres.

The means for identifying and separating the input ends of the optical fibres woven as weft forming each bundle, relative to the adjacent threads of the fabric, may also consist of a Jacquard motif in the pattern of the fabric and/or in the selvedge of the fabric, forming a separation matrix for the fibres belonging to each bundle, the motif being woven from the input sections of the bundle such that the input sections emerge on one predetermined side of the fabric distinct from that where the adjacent weft threads emerge, and/or at a predetermined, distinct distance from the first warp thread located between the pattern and the matrix belonging to said pattern and adjacent to said matrix.

Finally, the means for identifying and separating the input ends of the optical fibres woven as weft forming each bundle, relative to the adjacent threads of the fabric, may consist of a Jacquard motif in the pattern of the fabric and/or in the selvedge of the fabric, forming a separation matrix for the fibres belonging to each bundle, the input sections being woven into the identification matrix, each with a textile weft thread of a predetermined color, each weft thread color belonging to a particular bundle of optical fibres.

In other words, the invention particularly concerns a method for weaving a fabric including optical fibres used at least partially as weft threads and natural and/or synthetic fibres used as warp threads, said optical fibres being treated after weaving in such a way that they enable light to be diffused more or less perpendicularly to the longitudinal axis thereof and at least in the sections thereof located on the outer side of the fabric, characterised in that it uses a Jacquard weaving method using at least two independent networks or bundles of optical fibres, said method including the separation and identification of the different, independent networks of optical fibres during weaving.

The separation and identification of the different, independent networks of fibres may consist of a Jacquard weaving of the fabric selvedge, the input sections of the various bundles of optical fibres being woven so that each emerges on one predetermined, distinct side of the fabric and/or each emerges as a float at a predetermined distance from the selvedge of the fabric that is distinct from the other bundles.

Alternatively, the separation and identification of the different, independent networks of fibres may consist of a Jacquard weaving of the repeat or pattern of the Jacquard fabric, the input sections of the different optical fibre bundles being woven so that each emerges on a predetermined, distinct side of the fabric and/or each emerges as a float at a predetermined distance from the selvedge of the fabric that is distinct from the other bundles.

The invention also relates to a fabric comprising optical fibres used at least partially as the weft threads and natural and/or synthetic threads used as warp threads, said optical fibres being treated after weaving in such a way that they enable light to be diffused more or less perpendicularly to the longitudinal axis thereof and at least in the sections thereof located on the outer side of the fabric, characterised in that it is a Jacquard fabric whose weft comprises at least two distinct optical fibre bundles and means for identifying and separating said bundles from one another.

The means for identifying and separating the input ends of the fibres from one another may consist of a Jacquard motif in the selvedge of the fabric, the input sections of the various optical fibre bundles being woven so that each emerges on one predetermined, distinct side of the fabric and/or each emerges as a float at a predetermined distance from the selvedge of the fabric that is distinct from the other bundles.

Alternatively, the means for identifying and separating the fibre bundles from one another may also consist of a Jacquard motif in the repeat or pattern of the Jacquard fabric, the input sections of the different optical fibre bundles being woven so that each emerges on a predetermined, distinct side of the fabric and/or each emerges as a float at a predetermined distance from the selvedge of the fabric that is distinct from the other bundles.

BRIEF DESCRIPTION OF THE DRAWINGS

The invention will now be described in greater detail with reference to the attached schematic drawing which shows, merely by way of example, several embodiments of a fabric obtained using the weaving method of the invention.

FIG. 7 is a schematic top view similar to FIG. 3, the identification matrix being disposed only in the fabric selvedge;

FIG. 8 is a schematic cross section along VIII/VIII of FIG. 7;

FIG. 9 is a schematic top view similar to FIG. 5, the identification matrix being disposed only in the fabric selvedge;

FIG. 10 is a schematic cross section along X/X of FIG. 9;

FIG. 11 is a schematic top view of a plain fabric comprising textile fibres as the weft and optical fibres of the same color as the warp;

FIG. 12 is a schematic cross section along XII/XII of FIG. 11;

FIG. 13 is a schematic top view of a patterned fabric comprising textile fibres as the weft and optical fibres of the same color forming the pattern as the warp, the identification matrix being disposed downstream of the pattern;

FIG. 14 is a schematic cross section along XIV/XIV of FIG. 13;

FIG. 15 is a schematic top view of a patterned fabric comprising textile fibres as the weft and optical fibres of two different colors forming the pattern as the warp;

FIG. 16 is a schematic cross section along XVI/XVI of FIG. 15;

DETAILED DESCRIPTION OF THE INVENTION

Figure 1:
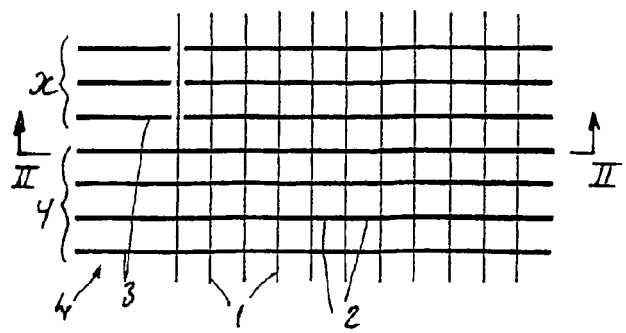
FIG. 1 is a schematic top view of a plain fabric comprising textile fibres as the warp and optical fibres of the same color as the weft.

Where necessary in the above figures, the different types of warp or weft optical fibres have been represented by lines of different thickness.

In addition, in the various figures of the drawing in support of the following description, the different warp and weft threads have been deliberately shown spaced from one another so that their paths in relation to one another can be more easily understood.

Similarly in certain figures the warp and weft threads made of textile (cotton, silk or other) other than optical fibre have deliberately been removed for greater clarity.

It will be understood that in practice these threads are part of the weaving and the different adjacent threads, whether textile or optical fibre, constituting the warp and weft of the finished fabric are in fact in contact with one another.

The weaving method of the invention is a Jacquard weaving method that is well known to the persons skilled in the art and will not therefore be described in detail in the present description.

The standard Jacquard weaving method is modified for the weaving of optical fibres, which are less flexible than normal textile fibres, particularly by reducing the speed of certain moving parts of the loom. This type of speed reduction may be chosen appropriately by a person skilled in the art, for example by choosing geared motors whose rotational speed is lower than the geared motors used in standard Jacquard looms.

The method of the present invention uses warp and weft threads that may, depending on the situation, be: firstly, made of natural or synthetic material of textile quality, for example, cotton-, wool-, silk- or polyamide-based yarns, or metallic threads; secondly, optical fibres; or thirdly, alternating use of a certain number of textile and optical fibres forming the warp and/or weft of the fabric.

The surface of the optical fibres is treated to allow light rays to travel more or less perpendicularly to the longitudinal axis of the fibre, at least in certain portions thereof. The surface treatment of the fibres is performed after they have been woven.

According to the weaving method of the invention, the luminous sections of the fibres, i.e. the portions where the surface is treated to allow diffusion of light, are located on the outer side of the fabric.

As explained in the preamble, only a limited number of optical fibres can be connected to a single light source. This light source may be chosen in the most suitable way and may, for example, be a light emitting diode or LED. A group of fibres designed to be connected to the same light source are referred to in the present description as a "bundle".

Where the optical fibres present as the warp are intended to be connected to light sources of the same intensity and color, the weaving method of the invention provides means for counting them and grouping a given number of adjacent fibres in a bundle and of spatially separating each resulting bundle of fibres from other threads in the fabric, irrespective of whether they are optical fibres belonging to different bundles or textile quality fibres.

The same applies to optical fibres woven as the weft.

Where optical fibres present in the warp are intended to be connected to light sources of different intensity and/or color, the method of the invention again makes it possible to count and group fibres in a bundle, each bundle being spatially separated from the other threads in the fabric, irrespective of whether they are optical fibres belonging to different bundles or textile quality fibres.

The same applies to optical fibres used as weft.

Additional spatial identification may be achieved by assigning a textile quality thread of a given color to each different colored bundle woven adjacently to the fibres constituting a bundle, thereby making it easier to identify the different independent bundles from one another by assigning them a color code.

Different versions of fabrics obtained using the weaving method of the invention will now be described.

It will be noted that where appropriate, the different thread colors are represented by lines of varying thickness.

In all the figures where the fabric is shown flat, the orientation of the fabric is shown in the direction warp ("C") and weft ("T").

FIG. 1 shows a plain fabric in which all the warp threads 1 are textile fibres that may or may not be the same color, and all the weft threads 2 are optical fibres all the input ends of which 3 are connected to light sources (not shown in the drawing) of the same color and intensity.

Figure 2:
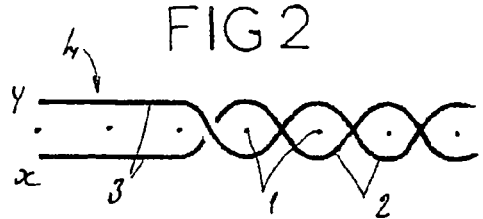
FIG. 2 is a schematic cross section along II/II of FIG. 1.

The counting of weft optical fibres for grouping in bundles, and the subsequent connecting of each bundle of a given number of fibres to a light source for said bundle, is achieved by means of Jacquard weaving in the selvedge of the fabric of a simple Jacquard motif or pattern that forms an identification matrix 4 of these input ends in relation to the input ends of the other bundles in which the input ends of the first "x" fibres in the fabric selvedge belonging to a first bundle emerge on the upper surface of the fabric as seen in FIG. 2, whilst the input ends of the adjacent "y" fibres emerge on the underside of the fabric.

A spatial separation of fibres belonging to the different bundles is thereby achieved, thereby obviating the need for tedious manual counting of the "x" and "y" fibres of each bundle that is clearly incompatible with industrial production.

Figure 3:
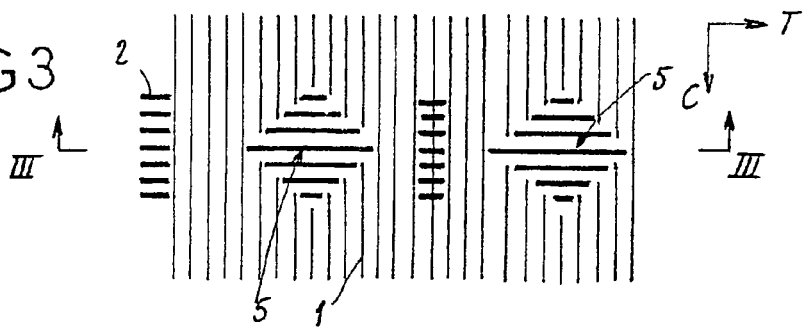
FIG. 3 is a schematic top view of a patterned fabric comprising textile fibres as the warp and optical fibres of the same color forming the pattern as the weft, the identification matrix being disposed in the selvedge and in the fabric.

FIG. 3 shows a fabric in which all the warp threads 1 are textile fibres. The weft threads 2 composing the base of the fabric are also textile fibres except for certain weft threads that constitute a monochrome luminous pattern 5 in the fabric repeat, for example a lozenge, as shown in FIG. 3, and which are optical fibres.

In order to distinguish the input ends 3 of the optical fibres constituting the pattern from the other weft threads and to group these optical fibres in a bundle, an identification matrix 4 is created. In FIG. 3 it can be seen that the luminous pattern is less than half the size of the width of the fabric repeat. It is therefore possible to weave two luminous lozenges into the width of the fabric.

Figure 4:
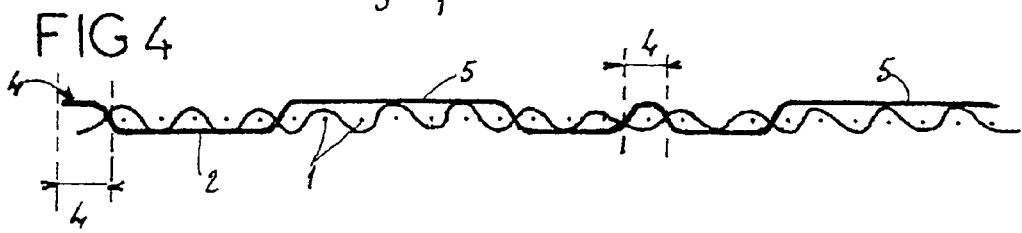
FIG. 4 is a schematic cross section along IV/IV of FIG. 2.

Each of the luminous patterns has its own identification matrix. One matrix is positioned in the fabric selvedge whilst the other is positioned in the repeat as shown in FIGS. 3 and 4. Once again the separation between the input ends of the fibres in the bundles and the adjacent weft threads is possible by causing the optical fibres to emerge on one side of the fabric, for example the upper surface, whereas the adjacent weft threads are woven so as to emerge on the underside of the fabric as can be seen clearly in FIG. 4.

It will be noted that for the sake of convenience, and in order not to overload the drawing, FIG. 3 does not show any weft threads other than the optical fibres constituting the pattern.

FIGS. 7 and 8 illustrate an alternative in which the width of the fabric repeat only contains a single luminous pattern. In this situation the identification matrix is disposed solely in the fabric selvedge. Once again, in order to make the drawing more easily readable, FIG. 7 does not show any weft threads other than the optical fibres constituting luminous pattern 5.

Figure 5:
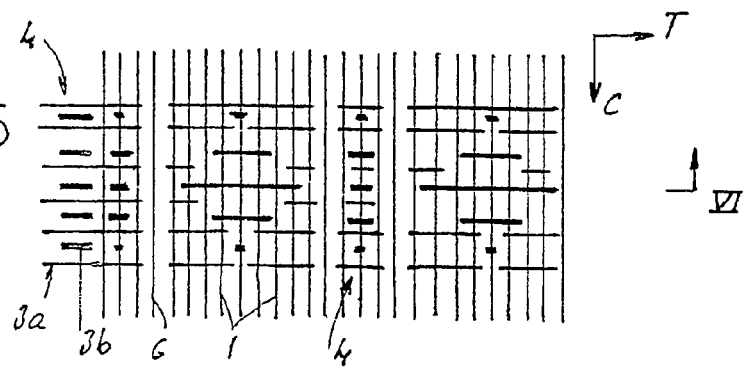
FIG. 5 is a schematic top view of a patterned fabric comprising textile fibres as the warp and optical fibres of two different colors forming the pattern as the weft.

FIG. 5 shows another version of the fabric shown in FIG. 3 in which luminous pattern 5 is not monochrome but composed of optical fibres of two different colors (shown in the drawing by lines of different thicknesses). This pattern 5 comprises a luminous base composed of a first series of optical fibres all belonging to the same bundle together with a lozenge-shaped pattern core composed of optical fibres of a different color and belonging to a second bundle.

Figure 6:
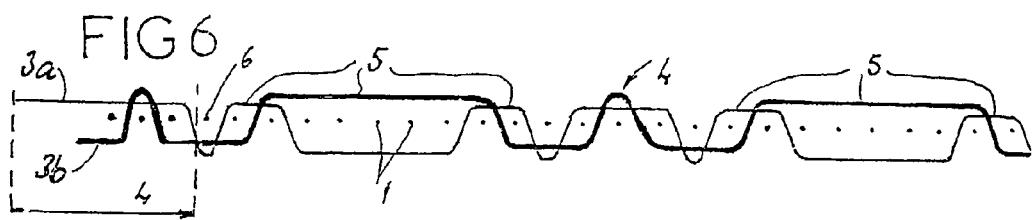
FIG. 6 is a schematic cross section along VI/VI of FIG. 5.

Once again, the other weft threads (textile quality and hence non-luminous) have not been shown to give greater legibility to FIGS. 5 and 6.

In this example identification matrix 4 makes it possible to identify and separate input ends 3a of the optical fibres of the first color, which are grouped in a first bundle and subsequently connected to a light source of the color required for the background to the pattern, from the input ends 3b of the optical fibres of the second color, which are grouped in a second bundle and subsequently connected to a light source of the color required for the core of the pattern.

As can be seen from FIG. 6, the spatial separation of input ends 3a and 3b of the optical fibres of each of the two bundles constituting luminous pattern 5, is, as regards the selvedge, not only achieved by weaving ends 3a and 3b so that some emerge above and others below the median plane of the fabric, but also by causing the input ends of the fibres belonging to each type of bundle to emerge in the matrix at a predetermined, distinct distance from the first warp thread 6 located between the pattern and the matching matrix and adjacent to said matrix. In this way, as can be seen from FIG. 6, input ends 3a of the fibres belonging to the first bundle emerge on the upper side of the fabric immediately after this first warp thread 6 whilst the input ends 3b of the fibres of the second bundle emerge on the underside of the fabric two warp threads away from the reference warp thread 6.

A different version of the alternative embodiment shown in FIGS. 5 and 6 is shown in FIGS. 9 and 10 in which the width of the fabric repeat only contains a single luminous pattern. In this version the identification matrix is disposed solely in the fabric selvedge. Once again, in order to make the drawing more easily readable, the figure does not show any weft threads other than the optical fibres constituting luminous pattern 5.

FIGS. 11 and 12 show a plain fabric similar to that in FIGS. 1 and 2. In this alternative embodiment of the invention the optical fibres constitute the warp threads 1 and the weft threads 2 are textile threads. No warp threads other than the optical fibres forming the luminous pattern have been shown in order to make the drawing clearer.

A simple Jacquard motif constitutes identification matrix 4 and makes it possible to count the input ends of "x" fibres and group them in a first bundle and spatially separate them from the input ends of the following "y" fibres belonging to a second independent bundle.

FIGS. 13 and 14 are similar to FIGS. 3 and 4 and show a fabric in which the weft threads are textile threads made of cotton, polyester, linen, silk or even metal and in which the warp threads are textile threads for the fabric base, and optical fibres for the threads constituting the luminous pattern. No warp threads other than the optical fibres forming the luminous pattern have been shown in order to make the drawing clearer.

In this example the Jacquard motif reference matrices 4 allow for spatial separation of the input ends of the optical fibres forming each warp pattern at intervals in the length of the fabric, relative to the adjacent textile warp threads.

FIGS. 15 and 16 are similar to FIGS. 5 and 6 but the warp and weft weaving directions are reversed: the weft threads 2 are textile threads and the warp threads 1 and textile threads for the base, and optical fibres of two different colors for the luminous pattern. Here the reference matrices 4 for each luminous pattern are disposed at intervals in the length (direction of the warp) of the fabric, upstream of each pattern to which they relate.

Figure 17:
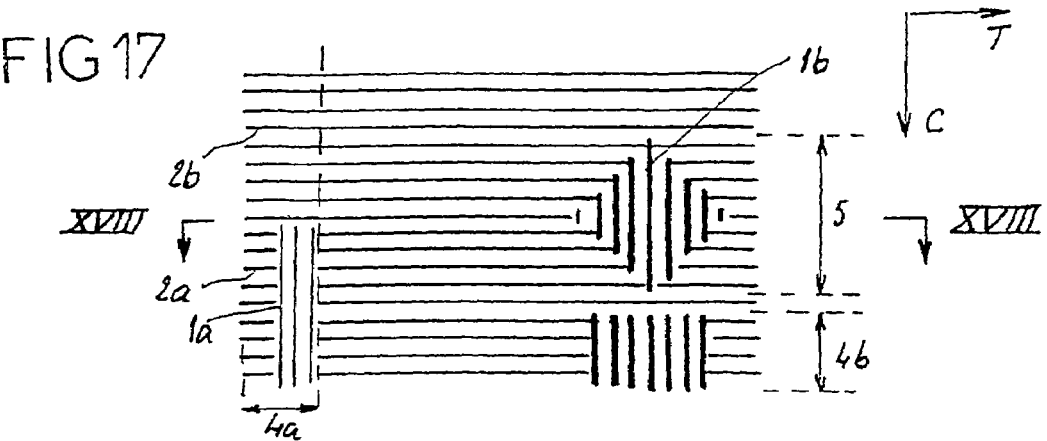
FIG. 17 is a schematic top view of a fabric comprising optical fibres of the same color as the weft and optical fibres of the same color as the warp, the warp and weft colors being different.
Figure 18:
FIG. 18 is a schematic cross section along XVIII/XVIII of FIG. 17.

FIGS. 17 and 18 show a fabric in which the weft threads are optical fibres of the same color and the warp threads are of two types: textile threads 1a, for example cotton, for the base, and optical fibres 1b of the same color for the luminous pattern 5 which is a lozenge in the drawing.

In order to make the drawing clearer, no warp textile threads other than the optical fibres of the pattern are shown. An exception to this is the three textile threads 1a located in the selvedge which show that the input ends of optical fibres 2a, 2b of the weft are counted and grouped in different bundles by means of a first Jacquard matrix 4a in the selvedge.

In the warp direction a second matrix 4b is also created downstream of the pattern (in the direction in which the fabric passes through the loom) making it possible to count and group the warp optical fibres in a bundle forming the lozenge of the pattern as well as to separate these optical fibres from the adjacent warp threads (textile threads not shown in the drawing).

Figure 19:
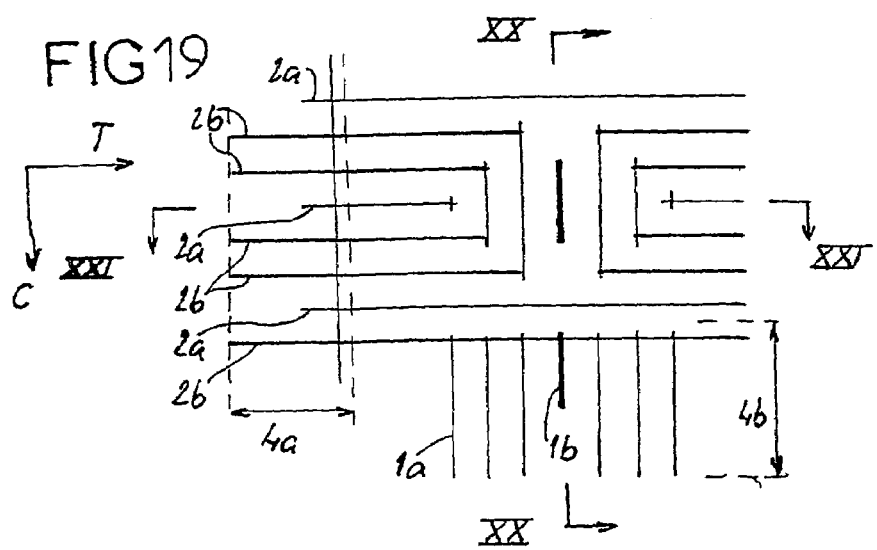
FIG. 19 is a schematic top view of a fabric comprising optical fibres of two different colors as the weft and optical fibres of two different colors as the warp.
Figure 20:
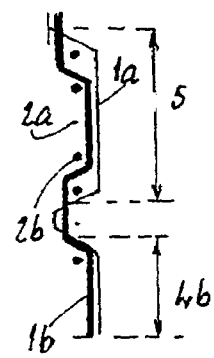
FIG. 20 is a schematic cross section along XX/XX of FIG. 19.
Figure 21:
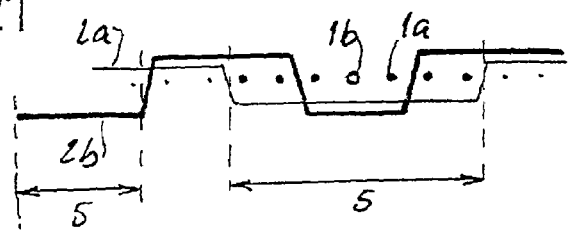
FIG. 21 is a schematic cross section along XXI/XXI of FIG. 19.

Finally, FIGS. 19 to 21 show a more complicated fabric in which a pattern 5 is formed on a base that may or may not be luminous. This pattern comprises weft optical fibres 2a, 2b of two different colors. It also comprises warp optical fibres 1a, 1b of two different colors.

Two matrices are therefore woven for a single luminous pattern, one 4a in the selvedge and the other 4b upstream of the pattern (in the direction in which the fabric passes through the loom).

In the first matrix 4a (see FIG. 21) the input ends of optical fibres belonging to the different bundles (i.e. of different colors) are woven so that they emerge on different sides relative to the median plane of the fabric, but also these input ends are of different lengths from the edge of the selvedge.

The same principle is applied to warp matrix 4b (see FIG. 20).

It should be noted that in all the foregoing examples the reference matrices shown relate to single, distinct luminous patterns, for example a lozenge. This assumes that the warp and/or weft optical fibres of each pattern are connected to independent light sources. For example, in the case of the fabric in FIG. 13, this way of connecting the different patterns at intervals in the length of the fabric makes it possible to cut the width of the fabric between two motifs (see cutting line "A—A" in FIG. 13) whilst ensuring that each motif can nevertheless be subsequently connected to its own independent light source.

It would nevertheless be possible to weave a single identification matrix common to several luminous patterns located at intervals in the width (direction of the weft) of the fabric, or in its length (direction of the warp). For example, if the same pattern is repeated several times in the width of the fabric, it would be possible to have only one identification matrix in the selvedge of the fabric. In this situation the fibres belonging to the optical bundle or bundles of these patterns would be connected to the same source. The lighting of all these patterns—at least of the weft optical fibres—would be simultaneous.

Moreover, it will have been understood from the foregoing examples that, irrespective of whether the optical fibres of the same type (i.e. of the same color and intensity) are used as warp or weft, the fibres used to weave the motif may, depending on the width of the luminous motif, be grouped in a single bundle or should be divided into several bundles and the function of the identification matrix will vary.

Thus where a luminous pattern uses a number of optical fibres of the same type as warp or weft that is lower than the maximum number of fibres that can be connected simultaneously to a single light source, the identification matrix for that pattern will be used to distinguish the optical fibres of the bundle from the adjacent warp and/or weft textile fibres.

Where the luminous pattern requires a number of warp or weft optical fibres greater than the maximum number of fibres that can be connected simultaneously to a single light source, the identification matrix will not only distinguish the optical fibres from other types of thread but will also distinguish optical fibres from one another to enable them to be assigned to the different bundles.

Clearly if a luminous pattern includes optical fibres of different colors and/or intensity, the identification matrix for that pattern will be used to distinguish the different types of fibres so that once weaving is complete, the fibres can be connected to the appropriate light sources.

The invention is clearly not limited to the embodiments described above as non-limitative examples. On the contrary, it includes all versions thereof.

The invention claimed is:

1. A method for weaving fabric at least partly containing optical fibres as warp and/or weft threads, said optical fibres being treated in such a way that they enable light to be diffused more or less perpendicularly to the longitudinal axis thereof and at least in the sections thereof located on the outer side of the fabric, wherein the method comprises the weaving of a Jacquard motif forming a visual matrix separating and identifying the input ends of a predetermined number of optical fibres intended to be grouped in bundles and connected to the same light source.

2. A weaving method as claimed in claim 1, wherein the Jacquard weaving of the input ends of each bundle of optical fibres woven as weft causes the input ends of each bundle of the fibres to emerge on one predetermined side of the fabric distinct from that where the adjacent threads emerge, and/or at a predetermined, distinct distance from the first warp thread located between a pattern and the matching matrix and adjacent to said matrix.

3. A weaving method as claimed in claim 1, wherein the Jacquard weaving of the input ends of each bundle of optical fibres woven as warp causes the input ends of these fibres to emerge on one predetermined side of the fabric distinct from that where the adjacent threads emerge, and/or at a predetermined, distinct distance from the first weft thread located upstream of the matrix and adjacent to said matrix.

4. A weaving method as claimed in claim 1, further comprising the following post-weaving stages in the following order:
   (i) bringing together the input ends of the optical fibres of each individual bundle present in the fabric, then
   (ii) crimping the input ends of each bundle, then
   (iii) using a hot knife to cut off the input ends of each bundle, then
   (iv) connecting each bundle of optical fibres to a light source.

5. A fabric at least partly comprising optical fibres as warp threads and/or weft threads, said optical fibres being treated after weaving in such a way that they enable light to be diffused more or less perpendicularly to their longitudinal axis and at least in the sections located on the outer side of the fabric, wherein the warp and/or weft comprises at least one bundle of a predetermined number of optical fibres intended to be connected to a common light source by their input ends, and wherein the fabric also comprises means for identifying and separating the input ends of the optical fibres of said bundle relative to the adjacent threads.

6. A fabric as claimed in claim 5, wherein the means for identifying and separating the input ends of the optical fibres woven as warp forming each bundle, relative to the adjacent threads, consist of a Jacquard motif in the pattern of the fabric, forming an identification matrix for the fibres belonging to each bundle, said pattern being woven from input sections of the bundle such that the input sections emerge on one predetermined side of the fabric distinct from that where the adjacent warp threads emerge, and/or at a predetermined, distinct distance from the first weft thread located downstream of the matrix and adjacent to said matrix.

7. A fabric as claimed in claim 5, wherein the means for identifying and separating the bundles of optical fibres woven as warp, relative to the adjacent threads of the fabric, consist of a Jacquard motif in the pattern of the fabric, forming an identification matrix for the fibres belonging to each bundle, the input sections being woven into the identification matrix, each with an adjacent textile warp thread of a predetermined color, each warp thread color belonging to a particular bundle of optical fibres.

8. A fabric as claimed in claim 5, wherein the means for identifying and separating the different bundles of optical fibres woven as weft, relative to the adjacent threads of the fabric, consist of a Jacquard motif in the pattern of the fabric and/or in the selvedge of the fabric, forming an identification matrix for the fibres belonging to each bundle, the pattern being woven from the input sections of the bundle such that the fibres emerge on one predetermined side of the fabric distinct from that where the adjacent weft threads emerge, and/or at a predetermined, distinct distance from the first warp thread located between the pattern and the matrix belonging to said pattern and adjacent to said matrix.

9. A fabric as claimed in claim 5, wherein the means for identifying and separating bundles of optical fibres woven as weft, relative to the adjacent threads of the fabric, consist of a Jacquard motif in the pattern of the fabric and/or in the selvedge of the fabric, forming a separation matrix for the fibres belonging to each bundle, the input sections being woven into the identification matrix, each with a textile weft thread of a predetermined color, each weft thread color belonging to a particular bundle of optical fibres.

* * * * *